Patented Feb. 14, 1928.

1,659,033

UNITED STATES PATENT OFFICE.

JAMES M. LEAVER, OF OAKLAND, CALIFORNIA, ASSIGNOR TO THE PACIFIC LUMBER COMPANY, OF SAN FRANCISCO, CALIFORNIA, A CORPORATION OF MAINE.

MANUFACTURE OF VISCOSE.

No Drawing.  Application filed December 23, 1924.  Serial No. 757,756.

This invention relates to the making of viscose as used in the production of artificial silk filaments or pellicles, and it has for its object a considerable reduction in the cost of the viscose together with the production of a superior thread or film.

Before describing my invention attention is called to the fact that the principal ingredient of viscose is cellulose, and in the commercial making of viscose for artificial silk manufacture, much care has always been exercised in securing a good source of cellulose, and while cotton itself as well as numerous plants have been used as the source, yet owing to cost and other features it remains that the only commercial supply of the cellulose for the making of viscose in general use, is the wood of certain trees such as the spruce and hemlock.

This is due to the fact that the cost of some woods is prohibitive, or that they contain certain substances injurious to viscose and difficult to remove.

In an attempt to cheapen the production of artificial silk I have made exhaustive experiments with many natural sources of cellulose, principally with waste material such as tree barks having no commercial value, but found that while a certain amount of cellulose can be produced from the bast fibers in some tree barks, the amount is not proportionate to the labor and expense involved in purifying the material, but in my researches I have discovered that the bark of one particular tree, the Sequoia, (Washingtoniana or Sempervirens, preferably the latter) is adapted to the production of a viscose, yielding upon regeneration a very superior thread or film.

The Sequoia, reaching the age of many hundreds, or even thousands of years has an excurrent trunk on which the bark attains a thickness all the way from three inches to a foot or more, and while there are large quantities of this bark available it has practically no use whatever in the arts, its only commercial application so far as I am aware is in a very limited way as a fibrous felting material, and to the lumbering interests on the west coast of the United States where the tree is native the bark is only a source of expense and danger, for owing to its great thickness it must be removed from the felled trees (by hand tools) before taking the logs to the mill for sawing as the bark would otherwise dull the saws and deflect them out of a straight path. The bark is usually fired in the woods after peeling so as to reduce the danger of accidents to the woodsmen by giving them clear ground to work on when taking out the peeled logs.

Physically the bark of the Sequoia varies considerably from the epidermis or non-fibrous exterior to the cambium, and substantially one third of it is fissured, weathered, filled with dirt gathered through the ages and is of small cellulose value, but for a distance of about two thirds of its thickness from the cambium outward its consists of long tough fibers, and this portion is what is known as "live bark".

These fibers are reddish-brown in color, long and remarkably tough, and contain a certain amount of resinous or gummy matter.

I have found that this portion of the bark upon proper treatment yields a high grade viscose eminently suitable for artificial silk manufacture, and since it is obtainable at practically no more than the labor cost of handling it, its use as the cellulose constituent of viscose marks an importnat advance in artificial silk manufacture, and artificial silk spun from it has been found to possess a greater strength than that obtained from wood-cellulose.

In the practical application of my discovery, the felled trees will preferably be hauled to the mill without peeling, so that much of the epidermis will be broken and rubbed off in handling the heavy logs, and when peeled at the mill with a view to collecting the live bark the inclusion of foreign matter may be more readily avoided.

After peeling, the bark is preferably broken into suitable size pieces and run through a large revolving screen or tumbler to remove as much as possible of the outer dead material, then it is suitably comminuted by feeding it against a shingle jointer, tho of course a special hog or other machine might be devised for the purpose.

After comminuting the live bark it is leached with hot water to extract the water soluble matter, then treated with dilute nitric acid, and alkali, or chlorine, and washing to release the coloring matter and the lignone complex, after which it is converted into sodium cellulose and xanthated in the usual manner to a viscose solution of the desired consistency.

Having thus described my invention it should be noted that it lies in the utilization of a heretofore waste product in the production of viscose artificial silk of highest grade, and while wood and other cellulose yielding materials have commonly been used for this purpose, the bark of conifers has never been used, and the particular adaptability of the live bark of the Sequoia to this purpose, a hitherto valueless material, is my discovery made through long experimentation, and I therefore claim it broadly.

I claim:—

1. In the making of viscose for artificial silk or film production, the use of the live bark of the Sequoia as the source of its cellulose.

2. In the making of viscose, the use of that portion only of the bark of the Sequoia which lies between the cambium and the epidermis.

JAMES M. LEAVER.